UNITED STATES PATENT OFFICE.

LUDWIG TAUB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PHARMACEUTICAL PRODUCT.

1,073,942. Specification of Letters Patent. Patented Sept. 23, 1913.

No Drawing. Application filed March 2, 1912. Serial No. 681,302.

*To all whom it may concern:*

Be it known that I, LUDWIG TAUB, doctor of philosophy, chemist, citizen of the German Empire, residing at Elberfeld, Germany, have invented new and useful Improvements in New Pharmaceutical Products, of which the following is a specification.

It has been observed that the salts of the hitherto unknown mercuric compounds of substituted phenols containing two or more substitutes, especially alkyl-, halogen-, alkoxy- or alkyl-halogen-phenols substituted in the nucleus have a disinfectant power, superior in many cases to that of sublimate, especially in the presence of soap or of serum. The above mentioned compounds are therefore therapeutically valuable products.

The new bodies containing in the shape of the anhydrids in their molecule the characteristic group

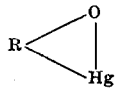

in which R stands for poly-substituted benzene nucleus, are obtained by treating the corresponding phenols with mercuric oxid or mercuric salts at high temperatures or by heating e. g. the mercuric salts of the phenols in presence or absence of fusion agents or solvents.

The new products are insoluble or difficultly soluble in water whitish crystalline compounds which are soluble in dilute alkalis forming salts and insoluble in ether and benzene. On being boiled with hydrochloric acid they are split up, HgCl₂ being produced.

In order to illustrate the new process more fully the following example is given, the parts being by weight:—12 parts of 1.4-dimethyl-phenol (para-xylenol) dissolved in 100 parts of methyl-alcohol are heated with 30 parts of mercuric-acetate in 100 parts of water until a test portion of the melt forms a clear solution with caustic soda lye. After cooling the new compound crystallizes from the liquid. By passing carbonic acid through the solution in alkali the anhydrid of the oxy-mercuric-dimethylphenol:

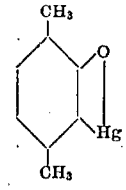

is precipitated as a fine white crystalline powder. It is almost insoluble in water and the usual organic solvents, but it is very easily soluble in alkalis forming the corresponding salts. By heating it with hydrochloric acid the compound is split up into dimethylphenol and mercuric chlorid. On being heated it is decomposed without melting. Also other of the above mentioned phenols can be used, e. g. creosol (3-methyl-ether of homopyrocatechin), pyrogallol-diethylether, bromxylenol, etc.

I claim:—

1. As new products, mercuric compounds of unsulfonated phenols substituted in the nucleus by at least two substituents containing in the shape of the anhydrids in their molecule the characteristic group:

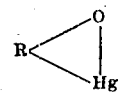

in which R stands for an unsulfonated poly-substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

2. As new products, mercuric compounds of unsulfonated phenols substituted in the nucleus by at least two substituents containing in the shape of the anhydrids in their molecule the characteristic group:

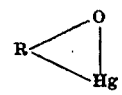

in which R stands for an unsulfonated alkyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

3. As new products, mercuric compounds of unsulfonated phenols substituted in the nucleus by at least two substituents containing in the shape of the anhydrid in their molecule the characteristic group:

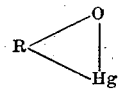

in which R stands for a polyalkyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

4. As new products, mercuric compounds of unsulfonated phenols substituted in the nucleus by at least two substituents containing in the shape of the anhydrids in their molecule the characteristic group:

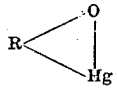

in which R stands for a polymethyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

5. As new products, mercuric compounds of unsulfonated phenols substituted in the nucleus by at least two substituents containing in the shape of the anhydrids in their molecule the characteristic group:

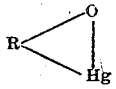

in which R stands for a dimethyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

6. As new products, mercuric compounds of phenols substituted in the nucleus by at least two substituents containing in the shape of the anhydrid in their molecule the characteristic group

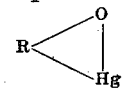

in which R stands for a polyalkyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

7. As new products, mercuric compounds of phenols substituted in the nucleus by at least two substituents containing in the shape of the anhydrid in their molecule the characteristic group:

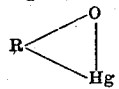

in which R stands for a polymethyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

8. As new products, mercuric compounds of phenols substituted in the nucleus by at least two substituents containing in the shape of the anhydrid in their molecule the characteristic group:

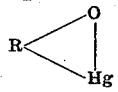

in which R stands for a dimethyl substituted benzene nucleus, which are whitish crystalline compounds soluble in dilute alkalis forming salts, insoluble in water, ether and benzene, splitting off HgCl₂ on being boiled with hydrochloric acid; and being valuable disinfectants, substantially as described.

In testimony whereof I have hereunto set my hand in the presence of two subscribing witnesses.

LUDWIG TAUB. [L. S.]

Witnesses:
  HELEN NUFER,
  A. NUFER.